United States Patent [19]

Beule

[11] Patent Number: 5,758,848
[45] Date of Patent: Jun. 2, 1998

[54] AUTOMATIC SWITCHING SYSTEM FOR TRACK-BOUND FREIGHT CARS

[76] Inventor: Erhard Beule, Horner Strasse 1, Paderborn, Germany, 33102

[21] Appl. No.: 619,763

[22] PCT Filed: Aug. 1, 1995

[86] PCT No.: PCT/DE95/01061

§ 371 Date: Mar. 29, 1996

§ 102(e) Date: Mar. 29, 1996

[30] Foreign Application Priority Data

Aug. 2, 1994 [EP] European Pat. Off. ............ 94250196

[51] Int. Cl.$^6$ ........................................................ B61L 3/00
[52] U.S. Cl. .......................... 246/182 B; 246/2 R; 246/6; 246/182 AB; 246/187 A; 104/26.1; 303/130; 364/426.01; 364/426.05
[58] Field of Search ........................... 246/2 R, 6, 2 E, 246/167 R, 176, 182 B, 182 C, 182 AA, 182 AB, 187 A; 104/29, 26.1, 26.2; 303/130, 134, 193, 198; 364/424.01, 424.02, 426.01, 426.05

[56] References Cited

U.S. PATENT DOCUMENTS

| | | |
|---|---|---|
| 3,654,456 | 4/1972 | Sarbach . |
| 3,964,702 | 6/1976 | Lardennois et al. ............ 246/4 |
| 4,498,711 | 2/1985 | Langley et al. ............ 303/13 |
| 4,610,206 | 9/1986 | Kubala et al. ............ 246/2 R |
| 4,711,418 | 12/1987 | Aver, Jr. et al. ............ 246/5 |
| 4,766,815 | 8/1988 | Chongben et al. ............ 104/26.2 |
| 5,511,749 | 4/1996 | Horst et al. ............ 246/187 A |

FOREIGN PATENT DOCUMENTS

| | | |
|---|---|---|
| 0144619 | 6/1985 | European Pat. Off. . |
| 4302377 | 8/1994 | Germany . |
| 1183071 | 3/1970 | United Kingdom . |

*Primary Examiner*—S. Joseph Morano
*Attorney, Agent, or Firm*—Cohen, Pontani, Lieberman, Pavane

[57] ABSTRACT

An automatic switching system integrated into freight cars includes a microcomputer for controlling the automatic system and regulating the shunting speed, a rotary pulse generator for determining the shunting distance and freight car speed, distance sensors for detecting the distance to and difference in speed relative to cars in front, an automatic coupling, a brake system for controlling the speed of the freight cars in the shunting zone and precise target braking on the sorting tracks and a data transmission devices for information exchange with a superordinated control station. The automatic switching system integrated into the freight cars makes it possible to decouple the freight cars by remote control, to precisely control the shunting speed, to maintain a minimum distance between the sections for safe setting of the switches, to automatically reduce speed by braking and re-coupling on the sorting tracks as well as to conduct a remote-monitored freight car diagnosis and brake test.

24 Claims, 3 Drawing Sheets

AUTOMATIC SWITCHING SYSTEM FOR TRACK-BOUND FREIGHT CARS

BACKGROUND OF THE INVENTION

1. Field of the Invention

The invention relates to a process and associated devices for automating the switching operation of track-bound freight cars.

2. Description of the Prior Art

The particular advantage of rail freight traffic is that individual freight cars can be assembled into larger trains, which can then be transported over longer distances at relatively low expense. However, in order to transport smaller quantities of freight in individual freight cars or groups of freight cars, it necessary to repeatedly assemble and split up the trains and sort the freight cars. Freight cars arriving from siding tracks and terminals must first be sorted and bundled according to their final directions in nearby switching yards, before then being transported in trains over longer distances to distant switching yards. There the freight cars are again sorted and, finally, transported to their destinations.

The switching systems needed to do this consist essentially of reception tracks, a shunting hump or hump yard followed by a switching zone, which in turn is followed by sorting tracks, where freight cars with the same direction of travel are collected and assembled into new trains. In the actual switching procedure, decoupled sections consisting of individual freight cars or groups of freight cars are pushed by a switching locomotive over the shunting hump. On the downhill side of the hump, the sections accelerate due to gravity and then arrive via the switching zone at the sorting tracks corresponding to their destinations.

In order to avoid damaging collisions during switching, it is necessary to slow the freight cars travelling onto the sorting track in a timely manner as they approach freight cars already standing there. In conventional switching yards, this is done by the dangerous and labor-intensive method of applying slipper brakes. In modern switching yards, automatic car retarders are used in combination with forwarding devices.

Particularly in large switching yards with extensive switching zones, there is also the problem that freight cars travel at different speeds, due to their different travelling characteristics, so that sections which travel faster catch up with slower freight cars in the switching zone. This leads to damaging collisions and also to "wrong runners," because the switches between the sections cannot be set in time and sections therefore run onto the wrong sorting track.

Various switching systems and processes are known which use staggered automatic car retarders in order to prevent the freight cars in the shunting zone from coming impermissibly close to one another, to reduce the speed at which the cars run onto the sorting tracks, and to close up the cars on the sorting tracks in a ready-to-couple manner with the help of forwarding devices.

A major disadvantage of previous switching systems, especially when slipper brakes are used and even when automatic car retarders and forwarding devices are employed, is that damaging collisions occur because the freight cars are not slowed down sufficiently. This frequently results in damage to cars or freight.

In addition, previous switching technology is disadvantageous in respect to the relatively high cost of automatic car retarders and forwarding devices, so that the use of this technology at the smaller switching yards and freight depots important for fine-scale distribution is uneconomical, and the labor-intensive slipper-brake method continues to be used at such facilities.

In the previous switching methods, the freight cars must first be identified and a cut list must be compiled to prepare for switching. Then the freight cars must be manually decoupled at the separation points called for by the cut list, and the brakes must be vented by actuating a valve. To ready the cars for departure after switching, the brake hoses must be connected, the travel safety checked and the brake power set; in addition, a brake test must be carried out. These activities are not only labor-intensive, but also delay the switching operation and thus the entire transport process by several hours per switching operation.

The transport process is further delayed by the fact that large switching yards with heavy freight traffic have a relatively low shunting output of approximately 250 cars per hour, maximum. This means that additional delays arise at peak traffic times, because only some of the freight cars being transported can be handled in a timely manner.

In GB 1,183,071 (U.S. Pat. No. 524,385) an automatic coupling system is indicated which detects the distance between the cars as some freight cars approach other cars located in front of them and brakes the approaching cars to a safe coupling speed. A speed regulator makes it possible to reduce the speed of the cars during free gravity shunting to a maximum level However, to ensure that empty freight cars reach the end of the track and that loaded cars can be safely braked, different maximum speeds must be set for empty cars (11 mph) and loaded cars (6 to 8 mph). As a result, there is considerable danger during this process that the empty cars will catch up with the loaded cars already located in the shunting zone, making it impossible to set the switches in time. The process thus allows only very low shunting outputs of, for example, 150 freight cars per hour. To rationalize the operation of switching yards, however, the shunting outputs must be increased to as much as 500 cars per hour. Providing a radar sensor along with the distance sensor, in order to detect speed relative to the cars in front, makes it possible to couple cars to slower-moving cars in front; however, this does not ensure that the distance between cars in the shunting zone can be reliably controlled in order to permit the unhindered setting of switches. Nor is it possible to switch larger groups of, for example, 5 to 10 cars using this method.

In U.S. Pat. No. 3,654,456, another control system for freight cars is indicated that can detect an "goal" freight car already located on the same track and reduce the speed in a controlled fashion to a safe coupling speed. However, this system, too, fails to permit sufficient automation or remote control of the switching operation; nor does it allow control of the shunting speed or of the distance between cars, which is absolutely necessary in order to safely set switches at higher shunting outputs. It is also impossible to increase the shunting output using this method.

Despite high expenditures on the construction of modern switching facilities, no one has thus far succeeded in fundamentally automating the travel of individual freight cars throughout the entire transport chain from sender to receiver, in order to speed up and rationalize the transport process and to avoid damaging collisions during switching. All previous known methods permit the automation of only a few particular partial steps. What is needed is a technically feasible and economically suitable method that allows the full automation of all switching steps at all rail yards where freight cars are switched.

SUMMARY OF THE INVENTION

The object of the present invention is to provide an automatic switching process and associated devices which avoids the above-mentioned problems and allows full automation of the switching operation at all switching yards, in order, in particular, to drastically reduce personnel costs, substantially increase shunting output, markedly speed up the transport process and completely avoid damaging switching collisions in order to protect freight cars and freight.

A further object of the invention is to control the speed of freight cars as they travel onto the sorting track or travel on these tracks in such a way that, first of all, the cars run onto the track at the highest possible speed and, secondly, their speed is limited in such a manner that the cars can be slowed to a safe coupling speed at any time by means of an "goal" braking device.

Furthermore, it is the object of the invention to achieve the highest possible gravity-shunting speed and shunting output, in order to optimally utilize existing equipment-intensive switching yards and to significantly reduce transport time.

The basic principle of this invention is the integration into the freight cars of the technology needed to fully automate the switching operation, including remote-controlled decoupling of freight cars, braking to an even speed, maintaining a minimum distance between cars in the area of the switches, and goal-correct braking on the sorting tracks.

To this end, freight cars are equipped with an automatic switching system integrated into the cars. This system makes it possible to decouple the cars by remote control, to release or unlock the brakes, to automatically slow the cars to a pre-programmable target shunting speed in the shunting zone, to regulate distance between cars, to control the speed at which cars travel onto the sorting track, to automatically brake cars on the sorting tracks in a targeted fashion as they approach cars already located there, and to automatically re-couple the freight cars.

Furthermore, the integrated, automated switching system allows automatic identification of arriving freight cars, remote-controlled setting of the type of brake operation, self-activated setting of brake power, remote diagnosis of the most important components, especially the automatic coupling and the braking system, as well as remote-monitored brake testing in order to establish readiness for departure.

The automatic switching system integrated into the freight cars consists essentially of a control unit—for example, in the form of a microcomputer—for controlling the automatic switching system and regulating the shunting speed; sensors for detecting the shunting distance, car speed and car acceleration; and sensors for detecting the distance to and difference in speed relative to other cars moving or standing in front. Furthermore, the automatic switching system provides electronically controlled valves or actuators for activating the freight car brakes and the automatic couplings. The release or unlocking of the brakes prior to switching and the setting of the load-dependent brake power and type of brake operation are carried out electronically by the control computer of the car.

Individual cars and sections are sorted as they travel through the shunting zone. This is done by setting switches between the individual cars or sections, so that the cars reach the sorting track intended for them. An essential goal of the invention is to achieve the highest possible shunting output.

A desired shunting output of 400 to 500 freight cars per hour requires a push-off speed of approximately 3 to 3.5 m/s.

To allow the switches in the shunting zone to be set in an unhindered manner, it is necessary for sufficiently large minimum distances of approximately 12 to 15 m to be created between the sections travelling on the inclined ramp of the shunting hump. At a push-off speed of roughly 3 m/s, a minimum shunting speed of approximately 6 to 8 m/s is required. However, different freight cars have different running resistances. At higher push-off speeds, this means that the faster freight cars (with lower running resistances) may catch up to the slower freight cars (with higher running resistances) while still in the shunting zone. When this happens, the switches cannot be set and the cars cannot be sorted as planned.

Basically, freight cars can be classified as cars with low or normal resistances of approximately 0.5 to 4%, here called "good runners"; freight cars with higher running resistances of roughly 4 to 8%, here called "bad runners"; and freight cars with sharply higher running resistances ("bad runners with especially high running resistances").

Freight cars with especially high running resistances are relatively rare and will come to a stop in the shunting zone itself or at the beginning of the sorting track. It is possible to detour around such cars by suitably controlling the switches, so as to avoid collisions with cars stopped in the shunting zone.

However, freight cars with higher running resistances of, for example, 4 to 6% are more common. Because these cars have no driving power of their own and can only accelerate due to gravity, a distance between sections sufficiently great for setting the switches can be attained only when the freight cars are slowed according to the invention to a shunting speed that is the same for all sections. In order to achieve a high shunting output, this shunting speed should be set as high as possible. According to the invention, in order to establish the target shunting speed, the speed selected as a reference is that achieved by a freely-travelling unbraked shunted freight car with a higher running resistance of, for example 5 to 8%. The target shunting speed can be determined either experimentally by a test run of an unbraked "bad runner," or mathematically from the gradient profile of the particular switching yard, using a running resistance of approximately 5 to 8% as a basis.

Switching yards are not identical in construction; rather, different yards often have very different gradients in the shunting zone. For example, there are some switching yards with a ramp inclination that remains largely constant in the shunting zone; there are other yards with lined-up ramps that have different inclinations, some of which feature distinctly flat zones in the area of the switches, where the cars always lose speed as the result of their running resistance. The selected shunting speed should allow the brake use in "good runners" to be as constant as possible, because this minimizes the energy required by the brake drive, especially in pneumatic braking systems.

For the sake of simplicity, it is possible in principle to establish one standardized constant shunting speed that can be used at all switching yards. However, a standardized shunting speed does not permit optimized shunting output at the different types of yard. In order to attain the highest possible shunting speed and to minimize the energy consumption of the braking drive, it is advantageous to establish a particular target shunting speed for each type of yard, based on the running behavior of bad runners with a higher running resistance.

The target shunting speed can be a speed function that depends on the shunting distance or the shunting time. The pre-programmable target shunting speed can be described by a constant speed, a combination of path-dependent or time-dependent speed ramps, or any other desired mathematical functions such as, for example, progressions.

The shunting speed function valid for a particular shunting hump system can either be directly preprogrammed on the control computer of the freight car and selectable as a program, or else sent via data transmission from a control station to the freight cars prior to switching.

A speed regulator ensures that the preset target speed is maintained. The speed regulator does this by continuously comparing the target speed to the actual speed; when there is deviation, the conventional freight car brakes are activated via the braking drive.

In a variant of the above process, the control station sends to the freight car not the target shunting speed, but rather the gradient profile of the particular shunting yard, or else a preprogrammed gradient profile is selected on the control computer of the freight car. Based on the known gradient profile and inclination of the track section and a presettable running and braking resistance constant for all sections of, for example, 5 to 8%, the control computer of the freight car is then able to automatically determine the target shunting speed valid in the particular case.

It is also possible to achieve regular speed behavior with the most consistent possible time-related or space-related spacing between cars not by slowing the cars to a pre-programmable target shunting speed, but rather by braking them in a way that results in acceleration behavior that remains as constant as possible for all sections over the distance travelled in the shunting zone. Because acceleration and speed are physically directly linked to one another via the time derivative, an even speed curve results for all sections, and thus spacing between freight cars that remains constant in terms of time or space is achieved.

A suitable method for controlling speed by controlling acceleration is to slow the freight car in such a way that its measured acceleration (speed change per unit of time) corresponds to a pre-programmable target acceleration. Like the target speed, the pre-programmable target acceleration can be derived from the known gradient profile of the shunting facility, or determined by a test run of an unbraked shunted freight car with increased running resistance. For individual ramp sections of constant inclination, constant acceleration values can be set.

A special variant of this method is to directly determine the target speed during shunting from the pre-programmable target acceleration on the basis of a speed-distance or speed-time function. Based on the physical link between acceleration and speed, regulating acceleration can be seen as a sub-variant of regulating speed.

According to the invention, an alternate self-controlling process for the above regulation of speed or acceleration control consists of slowing individual freight cars or sections in such a way that the most constant possible running and brake resistance results for all freight cars over the entire distance travelled in the shunting zone. The running and brake resistance is the sum of mass-related running resistance and braking deceleration. When running and braking deceleration is constant, an even speed curve also results along the path of travel for all freight cars and sections, given the same gradient profile, and thus constant spacing between cars in respect to time or distance is achieved.

Speed regulation is carried out with the help of a deceleration regulator, which ensures that the actual measured running and braking resistance conforms as exactly as possible to the preset target running resistance of, for example, 6%, corresponding to a deceleration of approximately 0.06 m/s². The actual running and braking resistance can be determined, for example, by installing on the freight car an acceleration pick-up which acts in the direction of travel. In a freely shunted freight car travelling on an inclined ramp, the portion of gravitational force acting on the freight car from the outside in the direction of travel in keeping with the inclination of the track and the acceleration force acting in the freight car mutually eliminate each other, so that an acceleration pick-up acting in the direction of travel registers only the running and braking deceleration.

In a special variant, the above process can also be fed back to a speed controller. In this regard, it is possible, for example, using the equation $a_{soll} = a_w + a_{vr} - a_{vs}$, to determine the target acceleration from the measurable values for freight car acceleration ($a_w$) and running and braking deceleration ($a_{vr}$) and a pre-settable constant reference value for running and braking deceleration ($a_{vs}$) of 50/00 (pas pro Mille), for example, corresponding to a target brake deceleration of $a_{vs} = 0.05$ m/s². It is then possible to find the target speed from the target acceleration, based on a distance-dependent or time-dependent function.

The particular advantage of this new process is that it is possible to set an even shunting speed for all freight cars without establishing any target speed. The process automatically adapts itself to any desired shunting facility. A further advantage is that, ignoring curve resistances, the braking systems of the freight cars are subjected to a constant brake force over practically the entire path of travel. In the case of pneumatically controlled brakes, this clearly minimizes the consumption of pressurized air. To be sure, the necessity of having a sensitive sensor to determine the running and braking resistance is disadvantageous.

Sorting the freight cars in the shunting zone requires a safe minimum stance for setting the switches in an unhindered manner. However, inaccuracies in registering and regulating speed, as well as especially high running resistances of individual freight cars, can lead to individual cars or sections making up as much as 300 m in the shunting zone, despite being slowed to a regular shunting speed; when this happens, switches can no longer be set in time.

Therefore, according to the invention, in supplement to shunting speed regulation, a distance regulator is provided which ensures, especially at high shunting outputs, that a pre-programmable minimum distance can be maintained to allow the safe setting of switches. The minimum distance is based on the length of the moveable switch tongue as well as on a safety distance in front of the switch and equals, for example, 10 to 15 meters. An especially advantageous effect is achieved by the combination according to the invention of the control and regulation of shunting speed with the regulation of distance. Primarily, controlling the speed, and thus maintaining the freight car spacing, is carried out by slowing to an even target shunting speed. The distance regulation serves as an additional safety measure to maintain the minimum spacing and permits an especially high shunting output. The measurement of the speed differential required for distance regulation can be carried out with the help of a distance sensor, in that the change in freight car spacing between two individual measurements is placed in relationship to the time duration of the measurements.

Given the limited range of the distance sensor, distance regulation alone, without prior speed control, would not suffice in curved systems to maintain the required minimum distance, because were the shunting speed not controlled, high speed differentials would arise between good and bad runners, which would be difficult to control by braking technology as cars neared one another. Known processes are suitable for technical realization of the distance control.

Compared to previous control processes using staggered car retarders, the above-described novel process and its variants and combination results in substantially more even running of the freight cars, and thus in constant distances between the sections, so that a clear increase in push-off speed and thus in shunting output is possible.

To ensure that individual cars and groups of cars reach the end of the sorting track or the end of the line of cars already standing on the sorting track, the individual cars or groups must travel onto the sorting track at the highest possible speed. On the other hand, however, the speed on the sorting track can be only as high as will permit the cars to be slowed at any time to a safe coupling speed, when they approach standing cars or cars moving at a lower speed, taking into account the range of the distance sensor. Because the exact location of standing cars is not known with sufficient reliability, the arriving cars must already be slowed to the permissible speed at the beginning of the sorting track.

This permissible entry speed is basically dependent on the deceleration time of the brakes, the attainable brake deceleration of the shunting freight car, and the range of the distance sensor. Depending on the size of the expected curve radii, the range of the distance sensor is limited to roughly 15 to 30 meters. The deceleration time $t_v$ is dependent on the braking system and the attainable brake deceleration $a_v$ is dependent, in particular, on whether the freight cars are loaded or empty.

For the maximum permissible speed on the sorting track, the known equation applies:

$$v_{max} = \sqrt{2 \cdot a_v \cdot s_{br} + v_{ku}^2}$$

where $v_{max}$ is the permitted speed, $a_v$ is the attainable brake deceleration, $s_{br}$ is the available braking distance, and $v_{ku}$ is the planned coupling speed. The available braking distance is reduced based on the deceleration time $t_v$ of the brakes by the distance $s_v$. Taking into account the maximum range of the distance sensor $d_{sen}$, the available braking distance is $$s_{br} = d_{sen} - s_v = d_{sen} - v_{max} \cdot t_v$$

For the maximum entry speed, ignoring the coupling speed $v_{ku}$, the following applies:

$$v_{max} = \sqrt{2 \cdot a_v \cdot (d_{sen} - v_{max} \cdot t_v)}$$

When the equation is converted, the following solution results for the permissible speed $v_{max}$:

$$v_{max} = \sqrt{(a_v \cdot t_v)^2 + 2 \cdot a_v \cdot d_{sen}} - a_v \cdot t_v$$

Here the expression $(a_v \cdot t_v)^2$ is generally negligible.

In freight cars with pneumatically-controlled brakes, the attainable brake deceleration $a_v$ also depends on the available pressure of the pressurized air supply. If the available pressure falls below a certain minimum, the pneumatically-controlled brakes no longer attain full braking power, so that the attainable brake deceleration $a_v$ is reduced to the extent that the actual pressure value $p_{ist}$ of the pressurized air supply falls below the value $p_{min}$. The necessary reduction in the brake deceleration can be described by the following equation:

$$a_v = a_{max} \cdot p_{ist} - p_0 / p_{min} - p_0$$

where $p_{ist}$ is the actual existing pressure value of the air supply, $p_{min}$ is the minimum pressure for reaching the maximum braking deceleration $a_{max}$, and $p_0$ is the minimum pressure for reaching an initial brake deceleration.

In individual freight cars, the attainable brake deceleration can be automatically calculated by the control computer of the freight car from the known values for freight car mass and braking force; from this, the permissible entry speed onto the sorting track can be determined. The freight cars are then slowed to this permissible speed when travelling onto and on the sorting track.

In larger groups of freight cars, the attainable braking deceleration frequently cannot be predicted with sufficient reliability, because under certain circumstances no continuous data or control line is available via which the lead car of a group can send a braking command to the following cars, or because the electronics or brake system of some freight cars malfunction, or because conventional freight cars without suitable control equipment are included in the group. In groups of freight cars with an unknown brake deceleration, therefore, the actual attainable brake deceleration must first be determined.

According to the invention, the actual attainable brake deceleration $a_v$ of individual freight cars or groups of freight cars can be determined by the control unit of the lead car as follows: during shunting in the shunting zone or upon entry onto the sorting track, a brake signal is sent from the first freight car to all other freight cars via a data or control line, and the maximum attainable brake deceleration $a_v$ is derived from the actual measured values for brake deceleration ($a_w$) relative to the level of the brake signal given.

The automatic process for controlling speed on the sorting track permits reliable determination of the attainable brake deceleration, even in the case of groups composed of any desired freight cars, in which the attainable brake deceleration is not known prior to switching, and thus also allows the reliable determination of the permissible speed for entry onto the sorting track; furthermore, it does this regardless of the availability of a data line or corresponding control devices on the following freight cars.

In order to avoid damaging collisions and to protect loads during switching, it is necessary to accurately slow the cars travelling onto the sorting track to an non-damaging coupling speed as they approach cars already standing on the track or moving on the track at a lower speed. For this purpose, the distance to a freight car already located on the sorting track is continuously monitored with the help of a distance sensor, and when a minimum distance of approximately 20 to 30 meters is fallen below, the "goal" braking is initiated. The automatic "goal" braking can be carried out using a speed regulator; specifically, by sending a target speed that decreases in linear or parabolic fashion (braking distance parabola) to a speed regulator as a target value.

The speed regulating device consists essentially of the microcomputer for controlling and regulating the speed and a controllable brake drive, with the help of which the conventional braking equipment of a freight car is activated.

A rotary pulse generator attached to the wheel set serves to detect the shunting distance that has been travelled, the current freight car speed, and the freight car acceleration. Distance regulation and goal braking control require the distance to freight cars standing or moving up ahead to be determined. Ultrasound, microwave or laser distance sensors located on both sides of the car and oriented on the buffer level of the cars, in order to detect flat cars, are suitable for this purpose. In the event of distance sensor outage, only speed regulation is carried out in the shunting zone, and distance control is dispensed with. For the sake of safety, the freight cars are slowed to a speed of approximately 1.5 m/s upon entry onto the sorting track.

In order to regulate speed in the shunting zone and on the sorting tracks, it is necessary for the freight car control to recognize in a timely manner where the shunting zone ends and the attached sorting tracks begin. Detecting of the shunting zone and the sorting track can be carried out with the help of a distance meter in combination with speed changeover limits or location markers. It is simplest to start the distance meter and to begin shunting speed regulation as follows: when a speed changeover limit of, for example, 5 or 6 m/s is exceeded, the shunting distance begins to be measured and the speed control is activated. The changeover value used for this purpose must be higher than the maximum push-off speed of 3 to 4 m/s in front of the shunting hump. The length of the shunting zone and the sorting track is communicated via data transmission from the control station to the control units of the cars before shunting. The first freight car that runs onto an empty sorting track is automatically slowed upon reaching the end of the sorting track and secured against further rolling by securing the brakes.

In supplement to the use of speed changeover limits, the use of location markers is also possible. The location marker system consists here of an active short-distance transmitter-receiver device on the freight car and stationary passive transmitter-receiver devices on the tracks, which preferably can be arranged at the beginning of the shunting zone and at the beginning and end of the sorting track and are recognized by the freight cars travelling past them. Light barriers, inductive initiators or broadcasting-based identification systems are suitable as short-distance transmitter-receiver devices.

When automatic coupling is activated, there has until now been the problem that, after the freight cars are separated on the shunting hump, the coupling must be switched from the impact position, which is meant to prevent premature coupling in front of the shunting hump, into the coupling-ready position. According to the invention, changing the coupling into the coupling-ready position can be carried out as follows: after a speed changeover limit has been exceeded and before the sorting track is reached, a suitable positioning command is sent from the control unit of the freight cars to the couplings.

In order to optimize speed control, it is possible to further sub-divide the shunting zone or sorting track into partial segments. Advantageously, a combination of speed changeover limits and distance instructions for rough-scale detection and simple location markers for fine-scale detection can be used, so that there is no need for exact distance instructions from a control station.

The freight car brakes need for speed control are activated with the help of an electronically-controlled pneumatic proportional valve, with the help of which the conventional brake cylinder of a freight car is controlled. The pressurized air needed for this is taken from an enlarged pressurized air storage device, which is filled via an air duct from the locomotive and, as applicable, filled in supplementary fashion by an air compressor on the freight car.

The control of the electronic pneumatic brake can at the same time control the train brake; the transmission of brake signals from the locomotive to the freight cars may take place, as desired, via a train data line or, if the electronics are not available, via the conventional air duct. The electronic brake control also has a load-dependent brake power control with electronic detection of the actual load weight; an electronic control of the type of brake operation; a nonskid device; and an electronic brake diagnosis means to monitor the functional readiness of the brakes prior to and during train travel.

Instead of an electronic pneumatic brake drive, it is also possible to use a controllable electric drive, which acts via a power transmission means directly on the conventional freight car brake. The control and regulation of the automatic shunting can, as applicable, be further optimized through the use of modern control methods such as fuzzy logic or neural networks.

The connection of the freight cars to one another is carried out with automatic couplings, which permit remote-controlled decoupling as well as automatic re-coupling when the freight cars collide with one another at a coupling speed of approximately 0.5 to 1 m/s. Suitable coupling systems are known or in development.

The observation and control of the entire switching process is carried out with the help of a superordinated control station, which consists here of a computer system with monitors and operating equipment. The control station is designed either as a stationary control station or as a compact control device installed in a locomotive. A combination of stationary control station and mobile control devices in locomotives is also possible, with the individual automating and control functions being distributed to the two systems. The data exchange the between the freight cars and the control station needed for the automatic control of the switching operation is carried out with the help of a data transmission system. The data transmission system consists either of a data broadcasting device for directly connecting the freight cars to a superordinated control station or of a data line travelling through the train, via which the control station of the locomotive is connected to the freight cars. For its part, the locomotive is connected via data broadcast to a superordinated control station (train bus). The possibility of combining the two systems also exists in respect to data transmission.

The control station serves essentially to identify the arriving freight cars, to detect the freight cars on individual tracks, to determine the separation points of the train to be switched, to begin the decoupling of the freight cars at the planned separation points via data transmission, to establish the values for the target shunting speeds of the individual sections and to transmit these to the freight cars, to control the push-off locomotive, and to monitor the switching process.

Furthermore, the control station makes it possible to monitor the degree to which the sorting track is filled and to display this status on monitors, as well as to determine and check the readiness for departure of the newly formed trains by monitoring the proper coupling of the freight cars; by determining the brake operation type in remote-controlled fashion depending on the length and weight of the train; by conducting a brake test monitored by the control station; and by compiling a cut list and a car list. Technical malfunctions, especially in the coupling or brake systems, are detected by sensors on the freight cars and transmitted via the train data line to the locomotive or via data broadcast to the stationary control station.

An automatic vehicle identification system serves to identify the individual freight cars. The vehicle identification system consists of electronic data carriers on the cars and of transmitter and receiver devices on the reception tracks. which are able to read and describe the data carriers as they travel past. Suitable systems are known or in development. The identification of the freight cars can also be carried out from the locomotive. in the event that a continuous train data line exists between the freight cars and the locomotive.

An electronic display and operating device on each freight car side is used to electronically enter, store and display the most important car and freight data, such as car number, destination rail yard, weight of load, name of customer, and type of load. In addition, it is possible to first enter the car and freight data into a superordinated computer system and then to transfer this information with the help of the data transfer system to the data storage device in the freight car. In this way, empty freight cars can be assigned to new transport jobs in a remote-controlled manner, for example.

With the help of the display and operating device, it is also possible for the automatic switching system to be activated manually from the freight car. The automatic speed control and, in particular, the self-activating goal brake device can thus be advantageously used as partial automatic systems. even at smaller freight depots and industrial facilities without a superordinated control station. The integrated automatic switching system can even be used to largely automate the switching method frequently used at smaller freight depots. that of fly shunting.

The freight cars should have a continuous control or data line reaching from car to car, so that the lead car, in the event of speed or goal braking, can pass on a continuous braking signal to the other freight cars in the group, thus allowing the brakes of the following freight cars can be operated in a remote-controlled manner by the first freight car of the group.

An essential economic advantage of the invention is that the existing infrastructure of switching yards with shunting humps, switching zones and slightly inclined sorting tracks can continue to be used without changes. Because of their relatively low rolling resistance, freight cars roll even without additional drive, so that it is not necessary for the cars to have their own costly drives in order to carry out the switching operation. However, it can be advantageous to equip individual freight cars with drives of their own, in order to allow them to move, for example, in a freight yard or track annex. without a switching locomotive, so as to make loading and unloading operations easier.

In particular, the invention has the following advantages:

The automatic switching system makes possible a completely automatic switching operation at all switching yards, freight depots and industrial facilities.

Personnel costs can be drastically reduced with the help of the automatic switching system.

By shortening the handling time and increasing the shunting output to up to 500 freight cars per hour, the switching operation can be speeded up considerably.

As a result, transport time can be significantly reduced, and a large part of the freight cars can be spared due to the shorter travel times.

The mass production of electronic components needed for the automatic switching system and serial upgrading of existing freight cars in workshops lead to considerably lower total costs, compared to automating switching yards by means of car retarders and transport devices.

Damaging collisions during switching are completely avoided, so that freight cars and freight are protected.

The invention is explained in greater detail in reference to an example shown in the drawings.

DETAILED DESCRIPTION OF THE PREFERRED EMBODIMENTS

Figure 1:
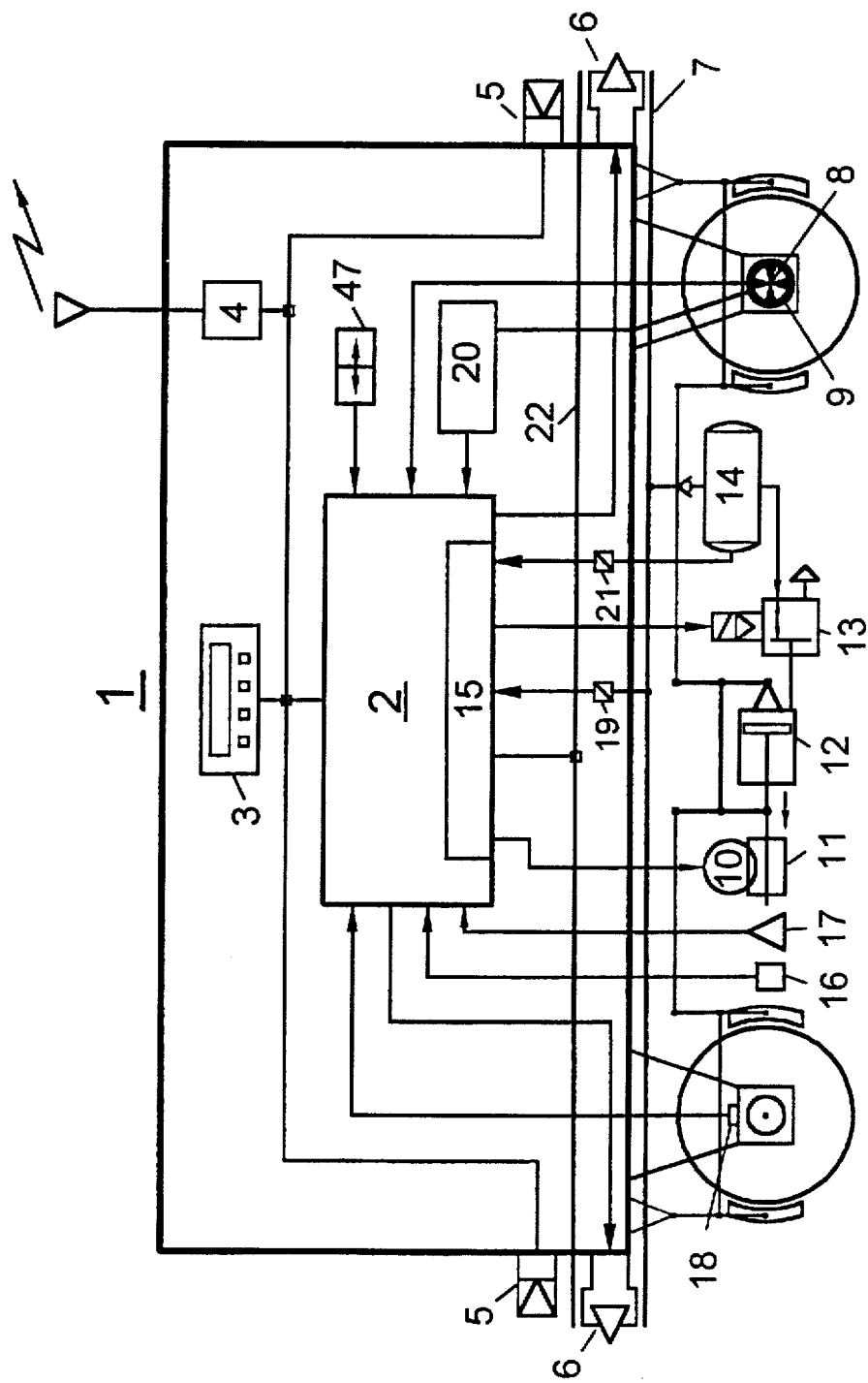
FIG. 1 shows a freight car with an integrated automatic switching system pursuant to the present invention.

In order to carry out a fully automatic switching operation, each freight car 1 in FIG. 1 is equipped with an automatic switching system integrated into the freight car. The control of the automatic switching system and the regulation of the speed are carried out with a control unit 2, which consists, for example, of a microcomputer, a microcontroller or a compact storage programmable control (SPS).

Furthermore, each freight car 1 is equipped with a display and operating device 3, a data broadcast transmitter-receiver 4, an identification data carrier 16, laser or microwave distance sensors 5 attached in both directions of travel, a rotary pulse generator 8 and automatic couplings 6.

The pneumatic brake cylinder 12 is controlled by the use of an electronically-controlled proportional valve 13, which is supplied with pressurized air from an air storage device 14. The air storage device 14 is supplied with pressurized air from a locomotive 39 via a main air duct 7 at a pressure of 5 to 8 bar. The proportional valve 13 is controlled directly by a brake control device 15, which is part of the control unit 2. The brake control device 15 is used to regulate the speed during automatic shunting as well as to control the freight car brakes during train operation. Additional braking functions, such as the release and unlocking of the brakes prior to switching, the control of the type of braking operation; the nonskid protection to prevent blocking axles, and the setting of the braking power dependent on load are also integrated into the brake control device 15 and control unit 2 in the form of control programs. The weight of the load is determined by a load sensor 18. The control of the freight car brakes during train operation is carried out, as desired, completely electronically via a train data line 22 or in the conventional manner through locomotive-controlled changes in air pressure, whereby the control pressure of the main air duct 7 is electronically detected via a pressure sensor 19.

The brake devices 12 to 15 and the automatic couplings 6 before and curing train travel are monitored by sensors (not described in more detail that are connected to the control unit 2. The identification data carrier 16 is also connected to the control unit 2 via a data line, so that information, such as freight and car data, can be exchanged between the data carrier and the control unit.

The electronics system is supplied with electrical power from a battery 20, which is recharged via an axle-driven generator 9 or a train bus bar (not shown) during train travel.

Figure 2:
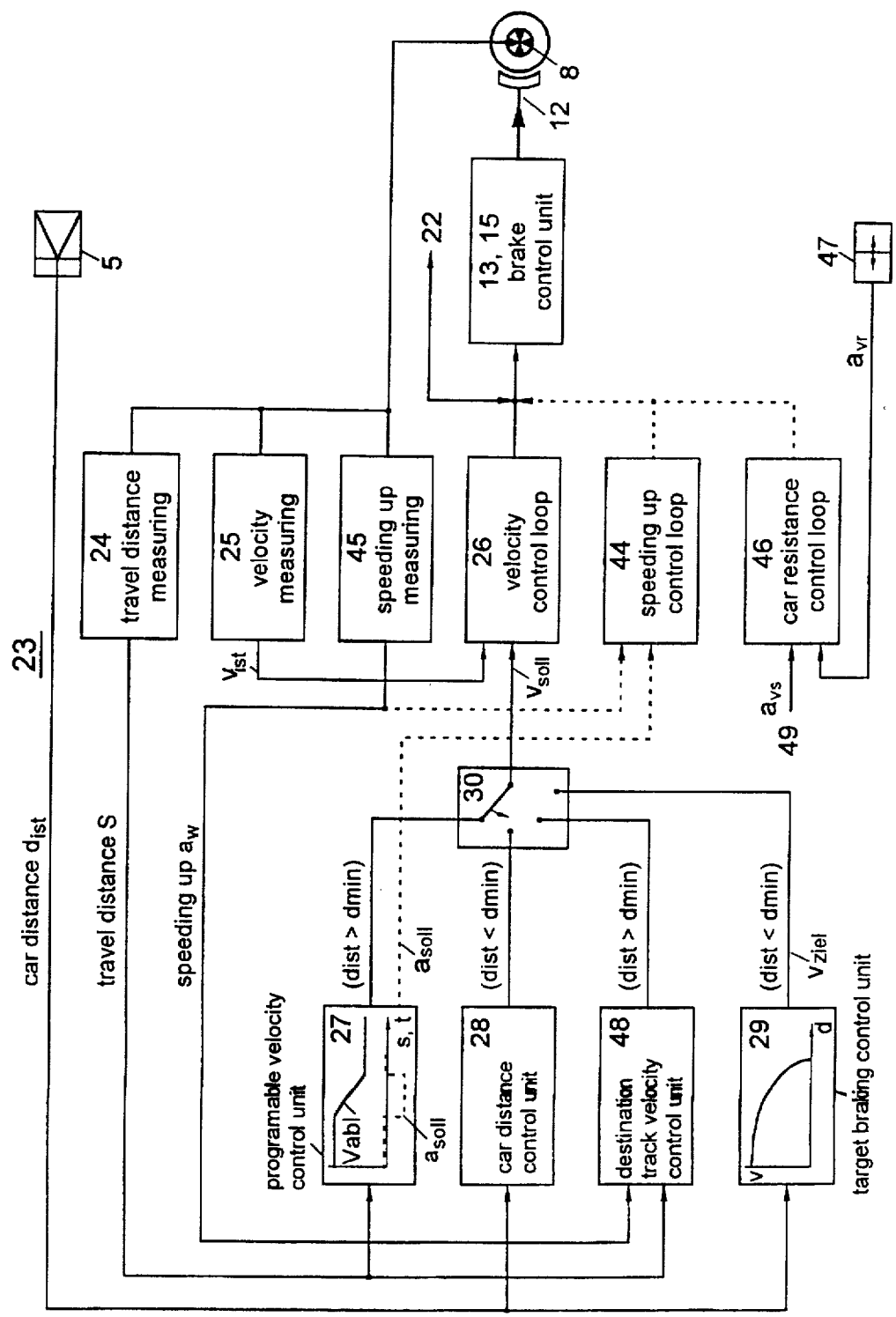
FIG. 2 shows the control and regulating structure of the integrated automatic switching system.

FIG. 2 shows in greater detail a control and regulating device 23 for controlling the automatic shunting and for regulating shunting speed. The control and regulating device 23 is part of the control unit 2. A digital speed regulator 26 integrated into the circuitry ensures that the target speed is maintained during shunting of the freight car. The control unit 27 serves for pre-programming and determining the time-dependent or distance-dependent target speed. The function for the target speed can be a constant value, a time-dependent or distance-dependent ramp or another mathematically describable function. The target speed function approaches as exactly as possible the speed curve of an unbraked shunted "bad runner" with a higher running resistance from 4 to 10%.

The circuitry of the control and regulating device 23 shown schematically in FIG. 2 can be further optimized by refining the regulating structure by means of, for example, a serial connection or a cascade of individual controllers or the use of a fuzzy logic circuit.

As a variant of the above procedure, which specifies a target shunting speed, a target acceleration can be used instead of a target speed to regulate the speed. The target acceleration is either fixedly preprogrammed in the control unit 27 or is established by a control station 31. To control the speed, it is possible to determine the target speed directly from the target acceleration and send this to the speed regulator 26 or, with the help of an acceleration regulator 44, to control the speed in such a way that the measured actual acceleration determined by the control unit or actual deceleration 45 conforms to the target acceleration 27.

A distance regulator 28 ensures that the minimum distance needed to set the switches ($d_{min w}$) is maintained in the shunting zone. It is activated only when one section approaches impermissibly close to another section in front of it ($d_{ist} < d_{min}$) and the danger exists that if the distance is reduced further it will no longer be possible to set the switches in time. In special cases, the distance regulator can also be used to maintain distance on the sorting tracks.

The target speed values determined by the speed control unit 27, the distance regulator 28 and a target brake control 29 are sent as target values to the speed regulator via a software-type converter 30. If a freight car is located in the shunting zone and the actual distance $d_{ist}$ is greater than a minimum distance for activating the distance regulator ($d_{ist} > d_{min}$), then the value found by the speed control unit 27 for the target shunting speed is sent to the speed regulator 26. If this switching distance is fallen below the minimum the distance regulator 28 is activated and the target value found by the distance regulator 28 is sent from the converter 30 to the speed regulator 26. When the freight cars travel onto the sorting track, the permissible entry speed onto the sorting track is found by a program block 48 and also sent as target value to the speed regulator 26. If a minimum distance has fallen below ($d_{ist} < d_{min}$), then a controlled target braking is initiated by the goal brake control 29 and the target values found are also sent by the converter 30 to the regulator 26.

In the travel distance detecting program block 24, the shunting distance S is determined from the pulse of the rotary pulse generator 8. The speed detecting program block 25 determines the actual speed $V_{ist}$ of the car. In the program block 45, the freight car acceleration $a_w$ is determined.

The speed regulator 26 ensures that the target speed is maintained by generating, in the event that target speed is exceeded, a control command for the valve 13, so that the brake cylinder 12 is activated until the actual speed conforms to the target speed. If the actual speed is lower than the target speed, then the brake is released and the freight car, given the existence of an inclined ramp, is accelerated by the force of gravity. The freight car does not need a motive drive of its own.

Figure 3A:
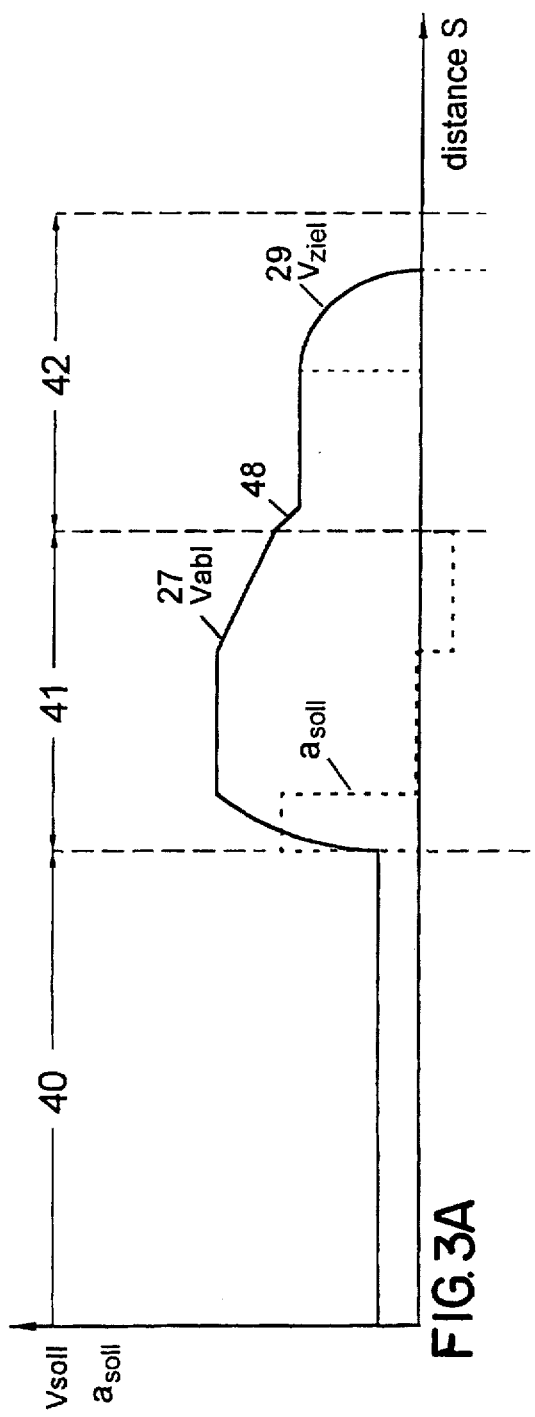
FIG. 3 shows, schematically, an overall diagram of a completely automatic switching facility with tracks and control station, as well as the speed and acceleration profile of the automatically shunted freight cars.
Figure 3B:
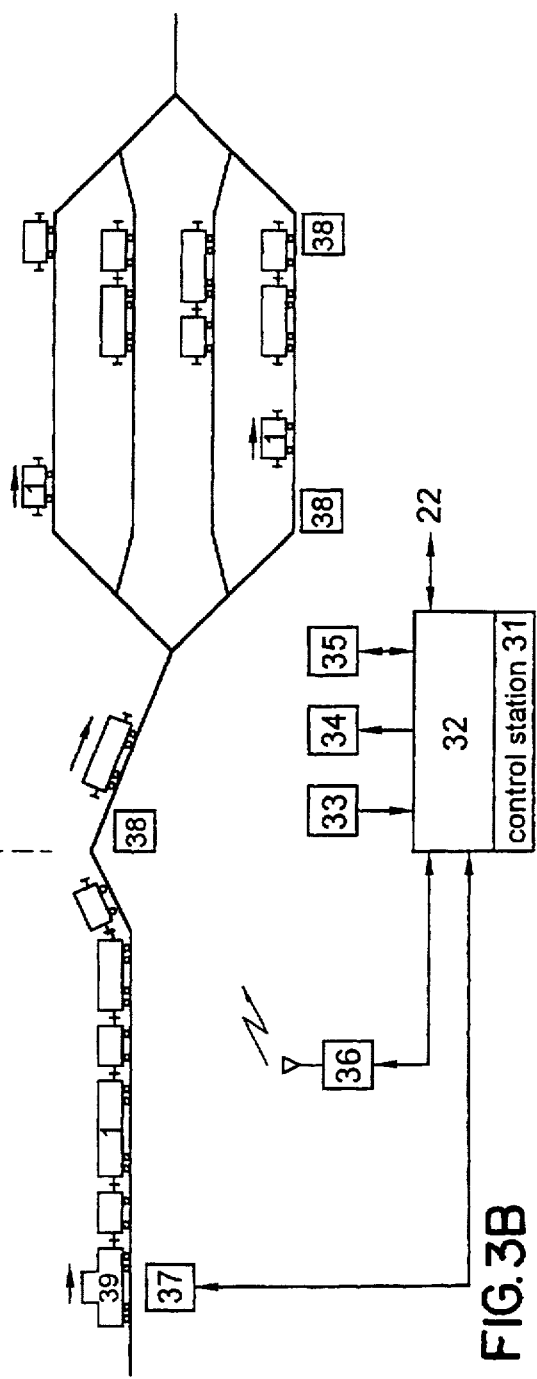

FIG. 3 shows a switching yard with reception tracks a, shunting zone 41 and sorting tracks 42, as well as the associated speed curve for the shunting speed $V_{abl}$ and the goal braking $V_{ziel}$ and the associated acceleration profile $a_{soll}$.

The switching operation is controlled with the help of the superordinated control station 31, which is equipped for this purpose with a computer 32, an operating device 33, a monitor 34, a data transmitter-receiver 36 for data exchange with freight cars 1 and locomotives 39, and a reading or identification device 37 for identifying the arriving freight cars. For automatic control of the shunting switches, there is a connection to a control box 35. Partial functions of the control station 31 that serve to control the freight cars can also be located in the locomotive 39, which is connected for this purpose via the train bus 22 to the freight cars.

When a freight train runs onto a reception track 40, the identity of the individual freight cars is first determined automatically with the help of the stationary identification device 37, which the cars travel past, and the data carrier 16 attached to the cars, and then data important for the switching operation, such as car number, destination rail yard, and weight of load, are sent to the control station computer 32. There these data are stored and displayed on the monitor 34. As desired, the collection of the data can also take place via the train data line 22. With the help of a train split-up program, the control station computer 32 establishes the separation points of the individual freight cars or freight car groups and determines the sorting tracks onto which these sections are to be switched.

Control instructions are then transmitted from the control station computer 32 by the data transmitter 36 or the train bus 22 to each individual freight car, in order to initiate the decoupling of the freight cars according to the cut list, to release or unlock the brakes and to activate the control and regulating device 23 for automatic shunting, as well as to transmit the values for the target shunting speed to the freight cars. As an alternative to using instructions from the control station, speed regulation can also be carried out on the basis of target values which are fixedly programmed into the control unit 2.

After switching readiness is established, the decoupled freight cars are pushed over the shunting hump by a remote-controlled switching or road locomotive 39. Under the force of gravity, the individual cars or groups of cars accelerate on the downhill side of the hump, so that spaces are created between the individual sections which are used in order to set the switches in such a way that the cars reach the sorting tracks intended for them.

As soon, as the freight cars on the shunting hump exceed the speed changeover limit of 5 m/s, the measurement of the shunting distance S is initiated and the speed regulator 26 is activated. At the same time, the automatic couplings 6 are converted by the control unit 2 from the impact position into the coupling-ready position. In the first part of the shunting zone 41, the freight cars in this example are slowed to a constant target speel $v_{abl}$ of 7 m/s. Because the second part of the shunting zone is located in a flat area without track inclination, in this area, in order to even out the speed of the good and the bad runners, a speed ramp of 7 m/s at the beginning to 6 m/s at the end is set as the target speed.

If the freight car fails, despite the speed regulation, to maintain a minimum distance $d_{min}$ to the freight car ahead of it in the shunting zone 41, then the distance regulator 28 is activated, which ensures by sending a lower target speed that the minimum distance $d_{min w}$ needed to safely set the switches is maintained at all times.

The beginning of the sorting track is made known to the freight car either via a background path in the control block 27 for the length of the shunting zone 41 or by means of location markers 38 which are sensed by transmitterreceivers 17 located on the cars. The braking distance available on the sorting tracks is limited by the maximum visible range of the distance sensor 5. In order to ensure a safe goal braking within the visible range of the distance sensor at all times, the freight cars are slowed at the beginning of the sorting track 42 by the control block 48 to the permissible sorting track speed, which is calculated according to the equation:

$$v_{max} = 2 \cdot a_v \cdot d_{sen} - a_v \cdot t_v.$$

In groups of freight cars, this speed depends decisively on whether a function-ready train data line 22 is available via which the lead freight car can trigger the brake devices of the other freight cars in the group which follow. The attainable brake deceleration $a_v$ is found from the known freight car data or determined, in the case of groups of freight cars, by a test braking. In determining the attainable brake deceleration, the pressure still existing in the air storage device 14 is taken into account, which is inquired after by a pressure sensor 21.

When the freight cars run onto the sorting track 42, the distance to the freight cars standing or moving ahead is continuously monitored with the help of the distance sensor 5. If the distance falls below approximately 20 to 30 meters, an goal braking is initiated as follows: a target speed $v_{soll}$ that drops with distance is sent from the goal brake control 29 to the speed regulator 26 until a safe coupling speed is reached.

However, if the freight car moving ahead has a higher speed, it can be useful to first keep the following section at a distance by means of the distance regulator 28, until the speed of the front car has been further reduced. At a coupling speed difference of approximately 0.8 m/s and a remaining distance of one meter, the brakes are released and the freight car behind is automatically coupled to the freight car in front with the help of the automatic couplings 6.

If no front car is located as yet on the sorting tracks, then slowdown is carried out at the end of the sorting track 42 either by means a movable buffer stop, which also triggers a goal braking, or through a distance-dependent stop command from the control block 27, or through stop instructions caused by a location marker 38 at the end of the sorting track.

After the sorting track is sufficiently full, the readiness for departure of the newly formed trains is established and checked using the superordinated control station 31. The applicable type of brake operation is set in a remote controlled fashion from the control station via the data transmitter 4 or the train data line 22. After the brake valve on the last freight car has been closed in a remote-controlled manner and a locomotive has been coupled to the train, the brake lines are filled with pressurized air. Then a remote-controlled brake test is carried out, which checks to determine whether all brakes are connected and ready to function. Malfunctions in the brakes or couplings are communicated via the data transmission means 4 or 22 to a stationary control station or to the control station in a locomotive. The determination of the load weight and control of the brake force is carried out with the help of the load sensor 18 and the electronic brake control 15.

With the help of the control station computer 32, the most important data on the newly formed train, such as length, total weight, brake weight, number of axles and special features, are collected and transmitted in the form of a brake list and a car list to the responsible locomotive and to superordinated computer systems. Train formation is thereby complete and readiness for departure has been established. The total switching process takes places completely automatically, so that manual activity in the area of the tracks is eliminated almost completely.

The automatic switching system can also be used at smaller switching yards without control stations or, in the event of a malfunction of the control station, advantageously as a partial automatic system. In this case, the freight cars are decoupled by hand and the automatic switching system with the functions of speed, distance and goal brake control is activated by a hand-operated switch on the display and operating device 3; the freight cars are then pushed over the shunting hump. Speed regulation in the shunting zone and goal braking with re-coupling on the sorting tracks are also carried out fully automatically, so that even without a control station switching can be fully automatic.

At smaller freight depots without shunting humps, the switching method of fly shunting is often used. With the help of the integrated automatic switching system, this simple switching method can also be largely automated. After remote-controlled or manual activation of the automatic system and decoupling of the last section, the latter is pushed away by means of brief acceleration and braking of the train, and is thus fed onto the planned sorting track. Goal braking and coupling are also carried out automatically.

In a special variant, the freight cars are equipped with a deceleration regulator 46 and an acceleration pick-up 47 acting in the direction of travel. The target value 49 for running and braking deceleration corresponds to the running deceleration of a freely-travelling freight car with higher running resistance (bad runner) and equals, for example, 6% or 0.06 m/s². The deceleration regulator 46 ensures by controlling and regulating the brake 12 that the sum of running and braking deceleration conforms to the target value 49 as exactly as possible. The brake 12 is controlled by the control unit 2 via a drive motor 10 and a power transmission gearing 11, based upon information picked-up by the pick-up 47.

I claim:

1. A combination of track-bound freight cars and an automatic switching system for the track-bound freight cars, for automating switching operation at a switching yard with a shunting system, comprising:

track-bound freight cars each having a brake device and a control unit;

an automatic control unit (27) integrated into the freight cars, which is operative to slow the freight cars travelling through a shunting zone (41) to one of a presettable target shunting speed ($v_{abl}$) that is as uniform as possible for all sections and is close to the speed of an unbraked freely running freight car with higher running resistance, and a presettable target acceleration ($a_{soll}$);

an automatic distance regulator (28), which is operative to slow the freight cars travelling through the shunting zone (41) when they approach moving or standing freight cars so that a safe minimum distance for switching switches in the switching yard is maintained;

an automatic control device (48), which is operative to slow the freight cars reaching or travelling on a sorting track (42) after the shunting zone to a permissible speed from which, taking into account attainable brake deceleration, the freight cars can be slowed within range of a distance sensor (5) acting in a direction of freight car travel to a safe coupling speed; and an automatic control and regulating device (23) that has a control circuit (30), a goal brake device (29) and a speed regulator (26), the control circuit being operative to:

a) given an adequate freight car distance ($d_{ist} > d_{min}$) in the shunting zone (41), activate the control unit (27) provided for slowing the cars to the target shunting speed;

b) activate the distance regulator (28) if the distance in the shunting zone (41) falls below a minimum distance ($d_{ist} < d_{min}$);

c) slow freight cars reaching or travelling on the sorting track (42) to the permissible speed determined by the control device (48);

d) activates the goal brake device (29) if the distance falls below a minimum distance ($d_{ist} < d_{min}$)), whereby the target speeds are sent from control circuit to the speed regulator (26), which acts via a brake control (13, 15) directly on the freight car brake device (12) and causes, by comparing the target speed to the actual speed (25), the pre-established target speed ($v_{soll}$) to be maintained.

2. A combination as in claim 1, wherein the shunting speed or acceleration is preprogrammable as a function dependent on the shunting distance (s) or the shunting time (t), whereby this function is determined by a control station of the control unit of the freight cars directly from a gradient profile of the switching yard or from the shunting speed of the unbraked shunted freight car with higher running resistance.

3. A combination as in claim 1, wherein the switching yard has a control station (31), which is equipped to activate the automatic control and regulating device (2, 23) of the freight cars, to transmit the value of the target shunting speed, to identify the arriving freight cars, to initiate decoupling of the freight cars at planned separation points, to release the brakes and to monitor by remote control coupling and braking functions of the freight cars, and further comprising one of a transmitting and receiving device (4, 36) and a train data line (22) operatively arranged to exchange data between the control station and the freight cars.

4. A combination as in claim 1, and further comprising a preprogrammable distance detector operative to determine a shunting distance (41, 42), whereby at least one of determination of the shunting distance (s), activation of the automatic control unit (27) and switching of an automatic coupling of the freight cars from an impact position into a ready-for-coupling position occurs after a speed changeover limit in the shunting zone (41) is exceeded.

5. A combination as in claim 4, and further comprising location markers, and a transmitter-receiver mounted on the freight cars, the detection of the shunting distance (41, 42) being carried out by the pre-programmable distance detector (24) in combination with the location markers (43) which are identifiable by the transmitter-receiver (17).

6. A combination as in claim 1, wherein the freight cars are equipped with rotary pulse generators (8) to detect a shunting distance, freight car speed (25), and freight car deceleration (45), as well as with sensors to detect the difference in speed relative to freight cars in front, whereby the distance sensor (5) is one of a laser sensor, a microwave sensor and an ultrasound sensor.

7. A combination as in claim 1, wherein the brake control has one of an electronically-controlled pneumatic valve operative to trigger a pneumatic brake cylinder of the freight car brake device (12), and a controllable electric drive (10) with a power transmission device (11) which acts on the brake device (12) of the freight car.

8. A combination as in claim 1, wherein the freight cars are equipped with a display and operating device (3), which permits the display and input of freight data as well as the activation of the control and regulating device (23) for the purpose of carrying out automatic freight car shunting.

9. A combination as in claim 1, wherein the freight cars have a data or control line (22) that runs from freight car to freight car and is connected to the control unit and via which, during freight car shunting, a lead freight car can forward a signal to following freight cars, so that upon regulation of one of speed (27), distance (28) and target braking (29) or control of permissible sorting track speed (48), brake devices (12 to 15) of following freight cars can be triggered by the lead freight car.

10. An automatic switching system for track-bound freight cars equipped with a controllable brake device, for controlling and regulating speed of freely shunting freight cars, for use in switching yards with a shunting hump, comprising:

a) a distance sensor mountable on the freight cars;

b) an automatic control device (48) mountable on the freight cars, which control device is operative to slow freight cars reaching or travelling on a sorting track (42) to a permissible speed such that, taking into account attainable brake deceleration, the freight cars slow to a safe coupling speed within a range of the distance sensor acting in a direction of freight car travel, whereby c) the larger the attainable brake deceleration is, the higher the permissible speed of the freight cars selected, d) the larger the range of the distance sensor is, the higher the speed selected, and e) the greater the deceleration time of the freight car brakes is, the lower the speed selected, the permissible speed being calculated automatically by the automatic control device on the basis of the equation $$v_{max} = (a_v \cdot t_v)^2 + 2 \cdot a_v \cdot d_{sen} - a_v \cdot t_v$$

whereby $v_{max}$ is the permissible speed of the freight cars or groups of cars on the sorting track, $a_v$ is the attainable brake deceleration of the freight cars or groups of cars, $t_v$ is the deceleration time of the freight car brakes, and $d_{sen}$ is the range of the distance sensor.

11. Automatic switching system as in claim 10, wherein the freight cars have pneumatically controlled brakes, the attainable brake deceleration $a_v$ being reduced to an extent that a pressure value of a pressurized air supply (14) to the brakes falls below a minimum pressure value $p_{min}$ required to achieve a maximum brake deceleration $a_v$.

12. Automatic switching system as in claim 11, wherein the attainable brake deceleration $a_v$ is reduced by the factor $$p_{ist} - p_0 / p_{min} - p_0$$

where $p_{ist}$ is the actual existing pressure value (21) of the air supply (14), $p_{min}$ is the minimum pressure for reaching the maximum brake deceleration $a_v$, and $p_0$ is the minimum pressure for reaching an initial brake deceleration.

13. Automatic switching system as in claim 10, wherein an attainable brake deceleration $a_v$ of the individual freight cars or groups of the cars is automatically determined by the control device from values for mass and brake force.

14. Automatic switching system as in claim 10, wherein an attainable brake deceleration $a_v$ of the individual freight cars or groups of the cars is determined automatically by the control device of a leading one of the freight cars in that during freight car shunting a braking signal is sent from the leading freight car via a control or data line (22) to all other freight cars and a maximum attainable brake deceleration $a_v$ is found from the actually measured values for brake deceleration $a_w$ relative to the level of the transmitted braking signal.

15. Automatic switching system as in claim 10, and further comprising a control unit operatively connected to one of a pre-programmable distance meter and location markers to detect a beginning of the sorting track, whereby the distance meter is started either when a speed changeover limit is exceeded or when the location markers (38) are passed at the beginning of the sorting track.

16. An automatic switching system for track-bound freight cars equipped with controllable brake equipment, for controlling and regulating the speed of freely shunted freight cars, for use at switching yards with a shunting system, comprising:
   a) an automatic control and regulating device (46), which is operative to slow the freight cars travelling through a shunting zone (41) to a uniform and presettable total deceleration ($a_{vs}$), whereby
   b) the total deceleration is the sum of running deceleration and braking deceleration, and
   c) the total deceleration is approximated to the running deceleration of an unbraked shunting freight car with a higher running resistance, the permissible speed of freight cars reaching or travelling on the sorting track being automatically determined by the control unit of the freight cars using the equation $$v_{max} = (a_v \cdot t_v)^2 + 2 \cdot a_v \cdot d_{sen} - a_v \cdot t_v,$$

whereby $v_{max}$ is the permissible speed of the freight cars on the sorting track, $a_v$ is the attainable brake deceleration of the freight cars, $t_v$ is the deceleration time of the freight car brakes, and $d_{sen}$ is the range of the distance sensor.

17. Automatic switching system as in claim 16, wherein a target value for total deceleration is fixedly preprogrammed in a control unit (2) of the freight cars, the total deceleration corresponding to running deceleration of an unbraked shunted freight car with a higher running resistance of approximately 5 to 10% or a running deceleration of 0.05 to 0.1 m/s².

18. Automatic switching system as in claim 16, and further comprising a sensor operative to detect the total deceleration ($a_{vr}$), the sensor being operative for measuring a sum of the running and braking deceleration in the direction of travel, whereby the acceleration that the freight car experiences due to gravity and the change in freight car speed is not taken into account during the detection of the total deceleration ($a_{vr}$).

19. Automatic switching system as in claim 16, wherein a target acceleration for the freight car is determined from a measurable value (45) for freight car acceleration ($a_w$) and a measurable value for running and braking deceleration ($a_{vr}$, 47) and a presettable value for target total deceleration ($a_{vs}$), using the equation $$a_{soll} = a_w + a_{vr} - a_{vs},$$

and is sent to an acceleration regulator (44) or, after computation into a target speed, is sent to a speed regulator (26).

20. Automatic switching system as in claim 18, and further comprising a distance regulator (28), which is operative to slow the freight cars approaching moving freight cars in front in the shunting zone (41) in such a way that a minimum distance safe for switching switches in the switching yard is maintained.

21. A process for automating switching of track-bound freight cars, equipped with a control unit and a braking device in a switching yard with a shunting zone and a sorting track, comprising the steps of:

slowing the freight cars when travelling through the shunting zone with an automatic control and regulating device to one of a pre-programmable shunting speed and a target acceleration that is uniform for all the freight cars, the pre-programmable shunting speed being substantially a speed curve of a freight car shunted freely and unbraked with a high running resistance;

maintaining a minimum distance between the freight cars when the freight cars approach one another in the shunting zone with an automatic distance regulator whereby the minimum distance is such that switches in the switching yard can be set without hindrance;

slowing down individual freight cars upon reaching the sorting track with the automatic control and regulating device to a permissible speed from which, taking into account attainable brake deceleration, the freight cars can be slowed to a safe coupling speed within a range of distance sensors on the freight cars; and cooperatively activating the automatic control and regulating device, a transmission of values for the target shunting speed, decoupling of the freight cars, releasing of the braking device, checking of functional readiness of the freight car brakes and automatically coupling cars, via a control station and data transmission means.

22. A process as defined in claim 21, including slowing the individual freight cars on the sorting tracks, when they frontally approach another freight car, to a safe coupling speed using an automatic goal brake control, and then coupling the freight cars.

23. A process as defined in claim 21, including automatically determining a permissible speed of each freight car upon reaching and travelling on the sorting track by the automatic control and regulating device based on the equation $$v_{max} = \sqrt{(a_v \cdot t_v)^2 + 2 \cdot a_v \cdot d_{sen}} - a_v \cdot t_v,$$

where $v_{max}$ is the permissible speed of the freight car, $a_v$ is attainable brake deceleration, $t_v$ is deceleration time of the freight car braking device and $d_{sen}$ is the range of the distance sensor.

24. A combination of track-bound freight cars and an automatic switching system for the track-bound freight cars, for automating switching operation at a switching yard with a shunting system, comprising:

track-bound freight cars each having a brake device;

an automatic control unit integrated into the freight cars, which is operative to slow the freight cars travelling through a shunting zone to one of a presettable target speed ($v_{abl}$) that is uniform as possible for all sections and is close to the speed of an unbraked freely running freight car with higher running resistance, and a presettable target acceleration ($a_{soll}$);

an automatic control device which is operative to slow the freight cars reaching or travelling on a sorting track after the shunting zone to a permissible speed from which, taken into account attainable brake deceleration, the freight cars can be slowed within a range of a distance sensor acting in the direction of freight car travel to a safe coupling speed; and an automatic control and regulating device that has a control circuit which a) given an adequate freight car distance ($d_{ist} > d_{min}$) in the shunting zone activates the control unit provided for slowing the cars to the target shunting speed; and
b) slows freight cars reaching or travelling on the sorting track to the permissible speed determined by the control device, the switching yard having a control station which is equipped to activate the automatic control and regulating device of the freight cars to transmit the value of the target shunting speed, to identify the arriving freight cars, to initiate decoupling of the freight at planned separation points, to release the brakes and to monitor by remote control coupling and braking functions of the freight cars, and further comprising one of a transmitting and receiving device and a train data line operatively arranged to exchange data between the control station and the freight cars, the control device being operative to automatically slow the freight cars running onto the sorting track, in the event of malfunction or nonavailability of the distance sensor, to a low speed such that upon bumping impacts without prior goal breaking no damage is done to the freight cars.

* * * * *